(12) United States Patent
Liu et al.

(10) Patent No.: US 11,306,587 B2
(45) Date of Patent: Apr. 19, 2022

(54) ROTATING SELF-DRILLING DEVICE FOR EXTRATERRESTRIAL OBJECTS

(71) Applicant: SHENYANG INSTITUTE OF AUTOMATION, CHINESE ACADEMY OF SCIENCES, Liaoning (CN)

(72) Inventors: Jinguo Liu, Liaoning (CN); Feiyu Zhang, Liaoning (CN); Mangkuan Wang, Liaoning (CN); Yuwang Liu, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 24 days.

(21) Appl. No.: 16/976,893

(22) PCT Filed: Dec. 28, 2018

(86) PCT No.: PCT/CN2018/124538
§ 371 (c)(1),
(2) Date: Aug. 31, 2020

(87) PCT Pub. No.: WO2020/118784
PCT Pub. Date: Jun. 18, 2020

(65) Prior Publication Data
US 2021/0040846 A1 Feb. 11, 2021

(30) Foreign Application Priority Data

Dec. 14, 2018 (CN) .......................... 201811533997.1

(51) Int. Cl.
*E21C 51/00* (2006.01)
*E21B 3/02* (2006.01)
*E21B 44/00* (2006.01)

(52) U.S. Cl.
CPC ................ *E21C 51/00* (2013.01); *E21B 3/02* (2013.01); *E21B 44/00* (2013.01)

(58) Field of Classification Search
CPC ............. E21C 51/00; E21B 3/02; E21B 44/00
See application file for complete search history.

(56) References Cited

U.S. PATENT DOCUMENTS

| 3,421,591 A * | 1/1969 | Ford ........................ E21C 51/00 |
| | | 175/323 |
| 2016/0024923 A1* | 1/2016 | Versteyhe ............... F01K 25/08 |
| | | 92/13 |

FOREIGN PATENT DOCUMENTS

| CN | 206060498 U | 3/2017 |
| CN | 206066360 U | 4/2017 |

(Continued)

*Primary Examiner* — Dany E Akakpo
(74) *Attorney, Agent, or Firm* — Novick, Kim & Lee, PLLC; Allen Xue

(57) ABSTRACT

The present invention relates to a rotating self-drilling device for extraterrestrial objects. One end of a pressure sensor installing barrel is connected with a rear cover; a reed fixing lower cover is installed on the rear cover; one end of a wire outlet post is connected with the reed fixing lower cover, and the other end is provided with a reed fixing upper cover; a plurality of reeds are arranged between the reed fixing upper cover and the reed fixing lower cover; both ends of each of the reeds are respectively connected with the reed fixing upper cover and the reed fixing lower cover; the other end of the pressure sensor installing barrel is connected with one end of a motor installing barrel; the other end of the motor installing barrel is connected with a motor installing barrel front cover; a motor and decelerator is placed in the motor installing barrel; both ends of a transmission shaft are respectively connected with the output end of the motor and decelerator and a ferrule; both ends of a milling head are respectively connected with the ferrule and a drill bit; a (Continued)

propelling spiral tube is sleeved outside the motor installing barrel; both ends are respectively connected with the ferrule and a bearing fixing cover; the bearing fixing cover is rotatably connected with the motor installing barrel; The overall structure of the present invention is light and compact. A drive system has only one motor to realize large penetration depth.

8 Claims, 2 Drawing Sheets

(56) References Cited

FOREIGN PATENT DOCUMENTS

| | | |
|---|---|---|
| CN | 207004428 U | 2/2018 |
| CN | 207798456 U | 8/2018 |
| JP | H0882582 A | 3/1996 |

\* cited by examiner

ROTATING SELF-DRILLING DEVICE FOR EXTRATERRESTRIAL OBJECTS

TECHNICAL FIELD

The present invention relates to a self-drilling device, and particularly to a rotating self-drilling device for extraterrestrial objects.

BACKGROUND

In the process of exploration of space by people, the collection of the corresponding physical features of different planets is an important process to understand the evolution of the universe and even the formation of life. For the detection of a planetary thermal field, in order to reduce the influence of external light radiation on the sensor data, a sensor needs to be arranged below surface soil. In order to measure some other physical features of the soil, such as section characteristics, the device needs to be drilled below the surface.

At present, the devices for successfully drilling extraterrestrial objects adopt the manner of extending the drilling by drill rods, which occupies large space and weight of a detector. Therefore, a device with the drilling depth not limited by own size is needed, to implement the drilling action of the extraterrestrial objects.

SUMMARY

To solve the above problems in the existing manner of extending the drilling by drill rods, the purpose of the present invention is to provide a rotating self-drilling device for extraterrestrial objects.

The purpose of the present invention is realized by the following technical solution:

The present invention comprises a wire outlet post, a reed fixing upper cover, reeds, a reed fixing lower cover, a rear cover, a pressure sensor installing barrel, a bearing fixing cover, a bearing, a motor and decelerator, a propelling spiral tube, a motor installing barrel, a motor installing barrel front cover, a transmission shaft, a ferrule, a milling head and a drill bit, wherein one end of the pressure sensor installing barrel is connected with the rear cover; the reed fixing lower cover is installed on the rear cover; one end of the wire outlet post is connected with the reed fixing lower cover, and the other end is provided with the reed fixing upper cover; a plurality of reeds are arranged between the reed fixing upper cover and the reed fixing lower cover; both ends of each of the reeds are respectively connected with the reed fixing upper cover and the reed fixing lower cover; the other end of the pressure sensor installing barrel is connected with one end of the motor installing barrel; the other end of the motor installing barrel is connected with the motor installing barrel front cover; the motor and decelerator installed on the motor installing barrel front cover is placed in the motor installing barrel; one end of the transmission shaft is connected with the output end of the motor and decelerator, and the other end is connected with the ferrule positioned below the motor installing barrel front cover; one end of the milling head is connected with the ferrule, and the other end is connected with the drill bit; the propelling spiral tube is sleeved outside the motor installing barrel; one end of the propelling spiral tube is connected with the ferrule, and the other end is connected with the bearing fixing cover; the bearing fixing cover is rotatably connected with the motor installing barrel through the bearing; the motor and decelerator drives the ferrule, the milling head, the drill bit, the propelling spiral tube and the bearing fixing cover to rotate through the transmission shaft;

The other end of the wire outlet post is provided with an adjusting nut for adjusting a distance between the reed fixing upper cover and the reed fixing lower cover;

The reeds are distributed evenly along the circumferential direction; both ends of each reed are respectively hinged with the reed fixing upper cover and the reed fixing lower cover; and each of the reeds is in a compressed state, and is bent outwards.

A sensor compartment is installed on the wire outlet post, and the sensor compartment is located in the middle of each reed.

The bearing fixing cover is divided into a bearing fixing upper cover and a bearing fixing lower cover; one end of the bearing fixing lower cover is connected with the other end of the propelling spiral tube; the other end of the bearing fixing lower cover is rotatably connected with the motor installing barrel through the bearing; and the bearing fixing upper cover is connected to the exterior of the other end of the bearing fixing lower cover.

A pressure sensor for measuring the change of required downward drilling pressure is installed in the pressure sensor installing barrel.

The propelling spiral tube is a hollow circular tube which is open on both ends; an outer surface is provided with a helix along an axial direction; and the soil cut by the milling head and the drill bit is discharged upward by the rotation of the propelling spiral tube.

The axial centerlines of the wire outlet post, the reed fixing upper cover, the reed fixing lower cover, the rear cover, the pressure sensor installing barrel, the bearing fixing cover, the propelling spiral tube, the motor installing barrel, the motor installing barrel front cover, the transmission shaft, the ferrule, the milling head and the drill bit are collinear.

The present invention has the advantages and positive effects that:

1. The present invention has simple structure, light and compact overall structure, flexible movement and ingenious control, and can be suitable for physical environments during detection of multiple extraterrestrial objects.

2. A drive system of the present invention has only one motor which is simple in drive control and can realize large penetration depth.

3. The downward drilling capability of the present invention is not limited by the size and length and can realize large drilling depth.

Wherein: 1 wire outlet post; 2 adjusting nut; 3 reed fixing upper cover; 4 reed; 5 sensor compartment; 6 reed fixing lower cover; 7 rear cover; 8 pressure sensor; 9 key; 10 pressure sensor installing barrel; 11 bearing fixing upper cover; 12 bearing; 13 bearing fixing lower cover; 14 motor and decelerator; 15 propelling spiral tube; 16 motor installing barrel; 17 motor installing barrel front cover; 18 transmission shaft; 19 ferrule; 20 milling head; and 21 drill bit.

DETAILED DESCRIPTION

The present invention is further detailed below in combination with the drawings.

Figure 1:
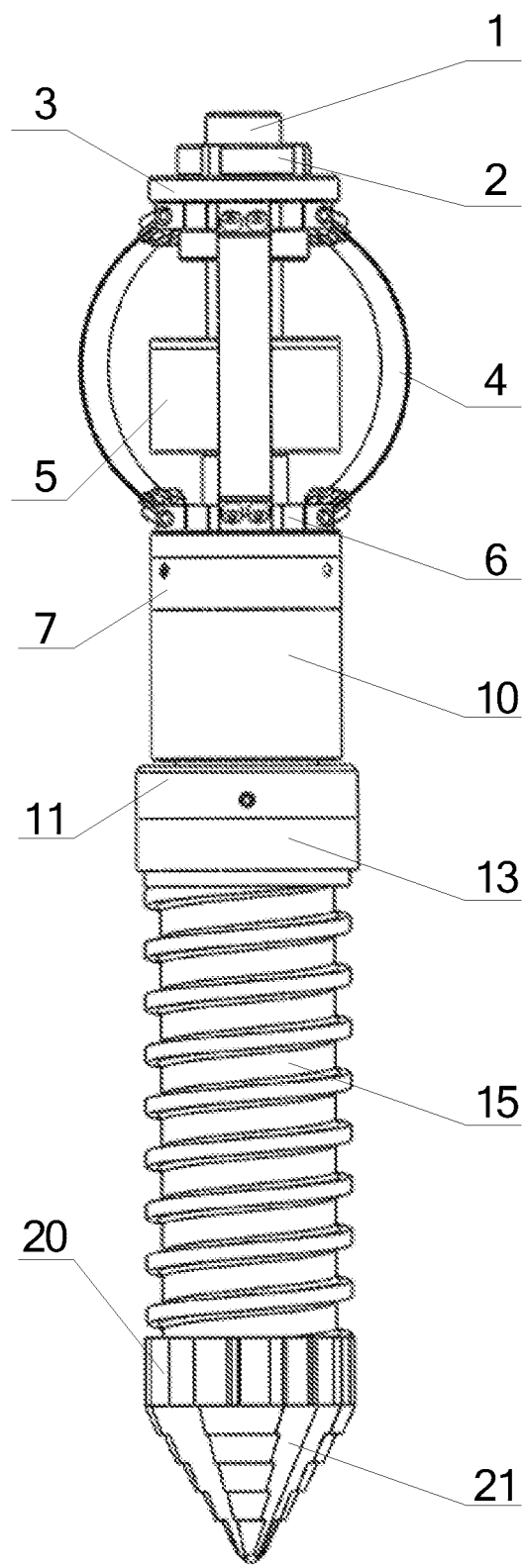
FIG. 1 is an external structural schematic diagram of the present invention.
Figure 2:
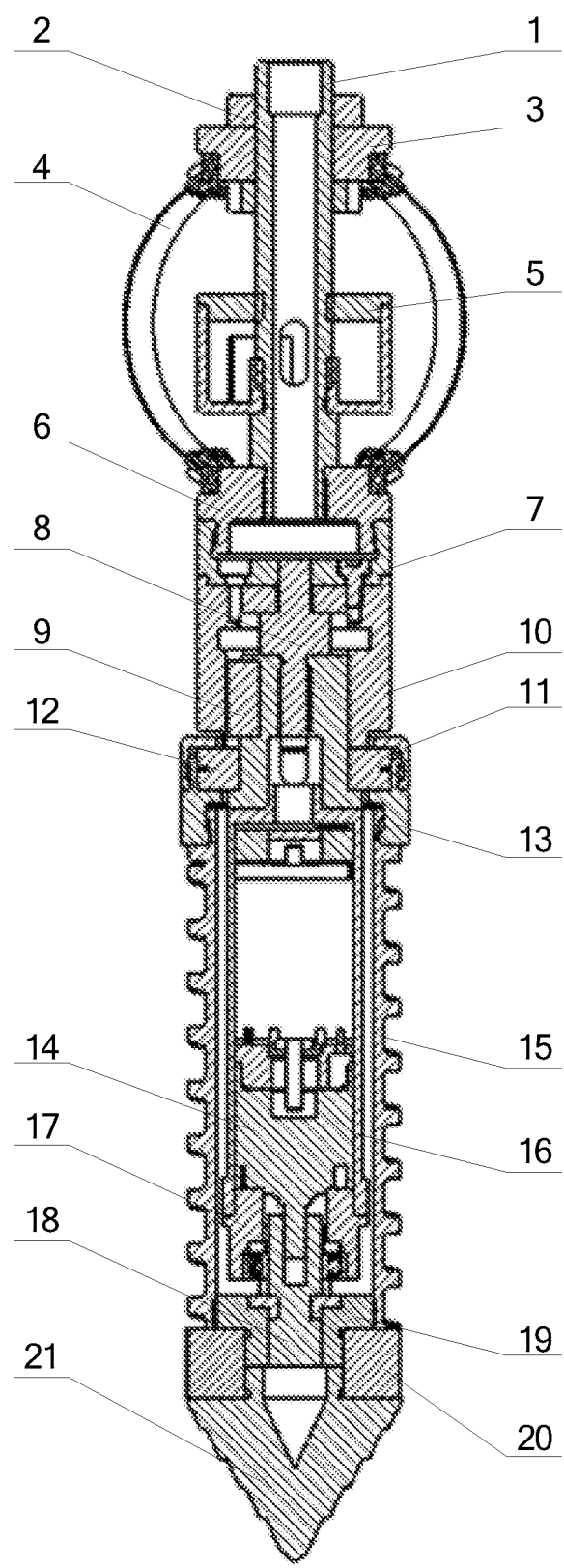
FIG. 2 is an internal structural sectional view of the present invention.

As shown in FIG. 1 and FIG. 2, the present invention comprises a wire outlet post 1, a reed fixing upper cover 3, reeds 4, a reed fixing lower cover 6, a rear cover 7, a pressure sensor installing barrel 10, a bearing fixing cover, a bearing 12, a motor and decelerator 14, a propelling spiral tube 15, a motor installing barrel 16, a motor installing barrel front cover 17, a transmission shaft 18, a ferrule 19, a milling head 20 and a drill bit 21, wherein the milling head 20 and the drill bit 21 form a drilling head cone; the motor and decelerator 14, the motor installing barrel 16 and the motor installing barrel front cover 17 form a drive system; the reed fixing upper cover 3, the reeds 4 and the reed fixing lower cover 6 form an untwisting device; and the transmission shaft 18 and the ferrule 19 form a transmission system.

One end (upper end) of the pressure sensor installing barrel 10 is fixedly connected with the rear cover 7 through a screw; the reed fixing lower cover 6 is connected with the rear cover 7 through a thread; one end of the wire outlet post 1 is connected with the reed fixing lower cover 6, and the other end is provided with the reed fixing upper cover 3; a plurality of reeds 4 are evenly distributed between the reed fixing upper cover 3 and the reed fixing lower cover 6; both ends of each of the reeds 4 are installed on the reed fixing upper cover 3 and the reed fixing lower cover 6 through hinges; and each of the reeds 4 is in a compressed state, and is bent outwards. The other end of the wire outlet post 1 is provided with an adjusting nut 2 for adjusting the position of the reed fixing upper cover 3, so as to adjust a distance between the reed fixing upper cover 3 and the reed fixing lower cover 6 through an adjusting nut 2 to adjust the tensioning degree of the reeds 4. The reeds 4 transmit a normal acting force generated by the propelling spiral tube 15 driven by the transmission system in a manner of clamping a hole wall generated by front drilling.

The other end (lower end) of the pressure sensor installing barrel 10 is connected with one end (upper end) of the motor installing barrel 16 through the key 9, and a pressure sensor 8 is installed between the pressure sensor installing barrel 10 and the motor installing barrel 16 to measure the change of required downward drilling pressure. The other end (lower end) of the motor installing barrel 16 is connected together with the motor installing barrel front cover 17 through a thread. The motor and decelerator 14 is placed in the motor installing barrel 16, and the motor and decelerator 14 is fixedly connected with the motor installing barrel front cover 17 through a thread. The transmission shaft 18 is rotatably installed on the motor installing barrel front cover 17 through the bearing. One end (upper end) is connected with the output end of the motor and decelerator 14, and the other end (lower end) is connected with the ferrule 19 positioned below the motor installing barrel front cover 17. The axial section of the ferrule 19 is "T" type, and is provided with a through hole through which the transmission shaft 18 penetrates in the middle. One end (upper end) of the milling head 20 is connected with the ferrule 19, and the other end (lower end) is connected with the drill bit 21. The propelling spiral tube 15 is sleeved outside the motor installing barrel 16; one end (lower end) of the propelling spiral tube 15 is connected with the ferrule 19, and the other end (upper end) is connected with the bearing fixing cover; and the bearing fixing cover is rotatably connected with the motor installing barrel 16 through the bearing 12. The motor and decelerator 14 drives the ferrule 19, the milling head 20, the drill bit 21, the propelling spiral tube 15 and the bearing fixing cover to rotate through the transmission shaft 18. The propelling spiral tube 15 is a hollow circular tube which is open on both ends; an outer surface is provided with a helix along an axial direction; and the milling head 20 and the drill bit 21 are driven by the motor and decelerator 14 to cut the soil. After the propelling spiral tube 15 rotates, the helix discharges the soil upwards to provide a downward penetrating acting force for the whole device. The milling head 20, the drill bit 21 and the propelling spiral tube 15 are mutually matched to complete the drilling action of the device.

The bearing fixing cover is divided into a bearing fixing upper cover 11 and a bearing fixing lower cover 13; one end (lower end) of the bearing fixing lower cover 13 is connected with the other end (upper end) of the propelling spiral tube 15; the other end (upper end) of the bearing fixing lower cover 13 is rotatably connected with the motor installing barrel 16 through the bearing 12; and the bearing fixing upper cover 11 is fixedly connected to the exterior of the other end of the bearing fixing lower cover 13. The bearing fixing cover is divided into the bearing fixing upper cover 11 and the bearing fixing lower cover 13, to facilitate disassembling and assembling of the bearing 12. The bearing 12 in the present embodiment is a double row angular contact bearing which is used to separate the rotating component from other fixed elements such as the drive system.

A sensor compartment 5 is installed on the wire outlet post 1, and the sensor compartment 5 is located in the middle of each reed 4. An attitude module and a sensor are mainly installed in the sensor compartment 5 to measure the inclined angle, downward displacement, temperature and other data of the device and the ground.

The axial centerlines of the wire outlet post 1, the reed fixing upper cover 3, the reed fixing lower cover 6, the rear cover 7, the pressure sensor installing barrel 10, the bearing fixing upper cover 11, the bearing fixing lower cover 13, the propelling spiral tube 15, the motor installing barrel 16, the motor installing barrel front cover 17, the transmission shaft 18, the ferrule 19, the milling head 20 and the drill bit 21 are collinear.

The present invention has the operating principle that:

The motor and decelerator 14 is operated; the transmission shaft 18 drives the ferrule 19 to rotate; and the ferrule 19 connects the milling head 20, the drill bit 21 and the propelling spiral tube 15 together to drive the above elements to rotate. The propelling spiral tube 15 is connected with the bearing fixing lower cover 13; the double row angular contact bearing 12 is used to separate the rotating component from other fixed elements such as the drive system; and the milling head 20 and the drill bit 21 are driven by the motor and decelerator 14 to cut the soil. After the propelling spiral tube 15 rotates, the helix discharges the soil to provide a downward penetrating acting force for the whole device. The milling head 20, the drill bit 21 and the propelling spiral tube 15 are mutually matched to complete the drilling action of the device. In the drilling process, the reeds 4 transmit a normal acting force generated by the propelling system driven by the transmission system in a manner of clamping a hole wall generated by front drilling.

The invention claimed is:

1. A rotating self-drilling device, comprising a wire outlet post, a reed fixing upper cover, a plurality of reeds, a reed fixing lower cover, a rear cover, a pressure sensor installing barrel, a bearing fixing cover, a bearing, a motor and decelerator, a propelling spiral tube, a motor installing barrel, a motor installing barrel front cover, a transmission shaft, a ferrule, a milling head, and a drill bit, wherein: a first end of the pressure sensor installing barrel is connected with the rear cover; the reed fixing lower cover is installed on the rear cover; a first end of the wire outlet post is connected with the reed fixing lower cover, and a second end of the wire outlet post is provided with the reed fixing upper cover; the plurality of reeds are arranged between the reed fixing upper cover and the reed fixing lower cover; two ends of each of the plurality of reeds are respectively connected with the reed fixing upper cover and the reed fixing lower cover; the second end of the pressure sensor installing barrel is connected with a first end of the motor installing barrel; a second end of the motor installing barrel is connected with the motor installing barrel front cover; the motor and decelerator installed on the motor installing barrel front cover is placed in the motor installing barrel; a first end of the transmission shaft is connected with an output end of the motor and decelerator, and a second end of the transmission shaft is connected with the ferrule positioned below the motor installing barrel front cover; a first end of the milling head is connected with the ferrule, and a second end of the milling head is connected with the drill bit; the propelling spiral tube sleeves over the motor installing barrel; a first end of the propelling spiral tube is connected with the ferrule, and a second end of the propelling spiral tube is connected with the bearing fixing cover; the bearing fixing cover is rotatably connected with the motor installing barrel through the bearing; during operation, the motor and decelerator drives the ferrule, the milling head, the drill bit, the propelling spiral tube, and the bearing fixing cover to rotate through the transmission shaft.

2. The rotating self-drilling device according to claim 1, wherein the second end of the wire outlet post is provided with an adjusting nut for adjusting a distance between the reed fixing upper cover and the reed fixing lower cover.

3. The rotating self-drilling device according to claim 1, wherein the plurality of reeds are distributed evenly along a circumferential direction; each of the two ends of each of the plurality of reeds are respectively hinged with the reed fixing upper cover and the reed fixing lower cover; and each of the plurality of reeds is in a compressed state, and is bent in a direction away from the wire outlet post.

4. The rotating self-drilling device according to claim 1, wherein a sensor compartment is installed on the wire outlet post, and the sensor compartment is located in a middle portion of each of the plurality of reeds.

5. The rotating self-drilling device according to claim 1, wherein the bearing fixing cover comprises a bearing fixing upper cover and a bearing fixing lower cover; a first end of the bearing fixing lower cover is connected with the second end of the propelling spiral tube; a second end of the bearing fixing lower cover is rotatably connected with the motor installing barrel through the bearing; and the bearing fixing upper cover is connected to an exterior of the second end of the bearing fixing lower cover.

6. The rotating self-drilling device according to claim 1, wherein a pressure sensor is installed in the pressure sensor installing barrel.

7. The rotating self-drilling device according to claim 1, wherein an outer surface of the propelling spiral tube is provided with a helix along an axial direction; and, during operation, cuttings caused by the milling head and the drill bit are moved upward by rotating the propelling spiral tube.

8. The rotating self-drilling device according to claim 1, wherein the wire outlet post, the reed fixing upper cover, the reed fixing lower cover, the rear cover, the pressure sensor installing barrel, the bearing fixing cover, the propelling spiral tube, the motor installing barrel, the motor installing barrel front cover, the transmission shaft, the ferrule, the milling head and the drill bit are coaxially arranged.

* * * * *